United States Patent
Chien et al.

(10) Patent No.: US 10,938,453 B2
(45) Date of Patent: Mar. 2, 2021

(54) ANTENNA PORTS INCLUDING SWITCH TYPE RADIO FREQUENCY CONNECTORS

(71) Applicant: HEWLETT-PACKARD DEVELOPMENT COMPANY, L.P., Spring, TX (US)

(72) Inventors: Jeremy Chien, Taipei (TW); Mars Chuang, Taipei (TW); Po Chao Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,327

(22) PCT Filed: Jul. 14, 2017

(86) PCT No.: PCT/US2017/042080
§ 371 (c)(1),
(2) Date: Jul. 26, 2019

(87) PCT Pub. No.: WO2019/013812
PCT Pub. Date: Jan. 17, 2019

(65) Prior Publication Data
US 2020/0136681 A1 Apr. 30, 2020

(51) Int. Cl.
*H04B 7/0413* (2017.01)
*H04B 1/40* (2015.01)
*H04L 5/14* (2006.01)

(52) U.S. Cl.
CPC ............. *H04B 7/0413* (2013.01); *H04B 1/40* (2013.01); *H04L 5/1423* (2013.01)

(58) Field of Classification Search
CPC .. H04B 7/0602; H04B 7/0604; H04B 7/0691; H04B 7/0413; H04B 7/0825
See application file for complete search history.

(56) References Cited

U.S. PATENT DOCUMENTS 5,854,986 A 12/1998 Dorren et al.
7,196,668 B2 3/2007 Lin et al.
(Continued)

FOREIGN PATENT DOCUMENTS

CN 105871430 8/2016

OTHER PUBLICATIONS

Park, D. et al, "Repetitive Pulse Width Modulation Based Single-RF MIMO System with compact 4-port antenna", Dec. 4-8, 2016.

*Primary Examiner* — Kevin Kim
(74) *Attorney, Agent, or Firm* — Tong, Rea, Bentley & Kim LLC (57) ABSTRACT

In an example, a radio module includes a first antenna port connected to a first transceiver, a second antenna port connected to a second transceiver, a third antenna port connected to a third transceiver, and a fourth antenna port connected to a fourth transceiver. The first antenna port and the second antenna port include a first switch type radio frequency connector and a second switch type radio frequency connector, respectively. The third antenna port and the fourth antenna port include a first receptacle type radio frequency connector and a second receptacle type radio frequency connector, respectively. A processor is connected to the first transceiver, the second transceiver, the third transceiver, and the fourth transceiver.

17 Claims, 5 Drawing Sheets

(56) References Cited

U.S. PATENT DOCUMENTS

| | | |
|---|---|---|
| 7,787,554 B1 | 8/2010 | Nabar et al. |
| 8,301,196 B2 | 10/2012 | Kauffman et al. |
| 8,615,268 B2 | 12/2013 | Sugiyama et al. |
| 2004/0005913 A1* | 1/2004 | Bollenbeck .............. H04B 1/48 455/562.1 |
| 2008/0205509 A1* | 8/2008 | Le Naour ............ H04B 1/0057 375/240.01 |
| 2009/0278750 A1* | 11/2009 | Man ....................... H04B 1/005 343/702 |
| 2010/0231472 A1* | 9/2010 | Tran .................... H01Q 1/2266 343/742 |
| 2010/0289705 A1* | 11/2010 | Shtrom ................. H01Q 15/14 343/702 |
| 2011/0065400 A1 | 3/2011 | Teikari et al. |
| 2013/0109449 A1 | 5/2013 | Desclos et al. |
| 2016/0057260 A1* | 2/2016 | Eremenko ........... H04M 1/0256 455/550.1 |
| 2017/0280413 A1* | 9/2017 | Zhang .................... G01S 5/021 |

\* cited by examiner

ANTENNA PORTS INCLUDING SWITCH TYPE RADIO FREQUENCY CONNECTORS

BACKGROUND

Multiple input, multiple output (MIMO) technology is used in radio communications to increase the capacity of a radio link. In particular, MIMO technology uses multiple antennas at both the source (transmitting) and destination (receiving) end of the radio link to exploit multipath propagation. By sending and receiving more than one data signal simultaneously over the same radio link, data transfer speeds can be increased and errors can be reduced.

DETAILED DESCRIPTION

The present disclosure broadly describes an apparatus, method, and non-transitory computer-readable medium for including switch type radio frequency (RF) connectors in antenna ports of a multiple input, multiple output (MIMO) radio module. As discussed above, MIMO technology uses multiple antennas at both the source (transmitting) and destination (receiving) end of the radio link to exploit multipath propagation. Recently, MIMO technology has been moving toward N×M MIMO implementations, in which N is the number of transmitting antennas supported by the radio module and M is the number of receiving antennas supported by the radio module. In some cases, N and M are both greater than two. These implementations support higher throughput over a radio link. However, more compact end product devices (e.g., notebook or laptop computers, tablet computers, mobile phones, etc.) may not have enough space to support more than two antennas total.

Examples of the present disclosure describe an N×M MIMO radio module that supports N transmitting antennas and M receiving antennas, where N and M are both greater than or equal to two, but are not necessarily equal to each other (e.g., N and M may be equal or unequal). As such, the MIMO radio module includes at least four antenna ports, although all four antenna ports will not necessarily be connected to a respective antenna. A first antenna port and a second antenna port include switch/switchable type radio frequency (RF) connectors for connecting to antennas, while a third antenna port and a fourth antenna port include receptacle type RF connectors for connecting to antennas. Within the context of the present disclosure, a switch type RF connector is understood to be a connector that may have two signal propagation paths: a first signal propagation path that goes through coaxial cable if the switch type RF connector is hooked with coaxial cable, and a second signal propagation path that goes through the transmission line on the radio module's printed circuit board (PCB).

If all four antenna ports are connected to respective antennas, then the connector of each antenna port connects to its respective antenna via a cable (e.g., coaxial cable). However, if less than all four ports are connected to respective antennas, then the antennas connect via cables to the antenna ports having the receptacle type RF connectors, and the antenna ports having switch type RF connectors do not connect to respective antennas (e.g., due to the end product device not having enough space for additional antennas). Instead, the antenna ports having the switch type RF connectors are routed to the PCB of the MIMO radio module to operate as monopole antennas that are capable of receiving and transmitting radio signals at the desired frequencies. Alternatively, the antenna ports having switch type RF connectors can connect to other miniature antennas like chip antennas, which can be integrated in a small PCB. This arrangement still achieves 4×4 MIMO functionality, even though the end product device includes no more than two antennas. Thus, throughput can be improved in strong signal areas even when the number antennas supported by the MIMO radio module is not maximized.

Figure 1:
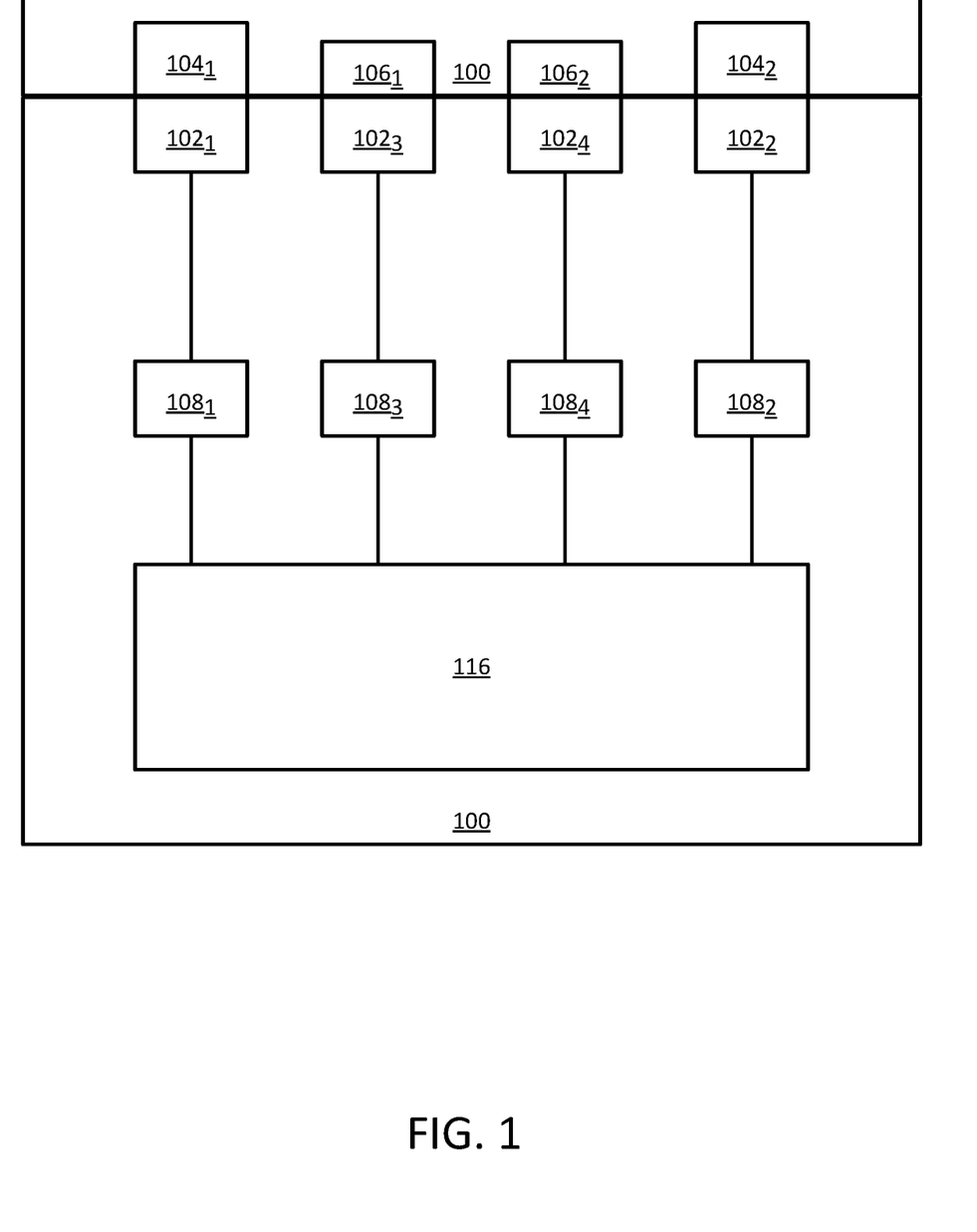
FIG. 1 depicts a high-level block diagram of an example radio module that uses a combination of receptacle type connectors and switch type connectors to connect antennas to antenna ports of the radio module.

FIG. 1 depicts a high-level block diagram of an example radio module 100 that uses a combination of receptacle type connectors and switch type connectors to connect antennas through antenna ports of the radio module. In one example, the radio module 100 is an N×M MIMO radio module, i.e., a MIMO radio module that supports N transmitting antennas and M receiving antennas. In a further example, both of N and M are at least (i.e., greater than or equal to) two, but are not necessarily equal to each other.

In one example, the radio module 100 comprises a plurality of antenna ports $102_1$-$102_4$ (hereinafter collectively referred to as "antenna ports 102"). In the example illustrated in FIG. 1, four antenna ports 102 are shown (e.g., the radio module 100 is a 4×4 MIMO radio module); however, in further examples, a fewer or greater number of antenna ports 102 could be included in the radio module 100.

In one example, a first antenna port $102_1$ and a second antenna port $102_2$ of the radio module 100 each include a respective switch type radio frequency (RF) connector $104_1$ or $104_2$ (hereinafter collectively referred to as "switch type RF connectors 104") for connecting to a physical antenna. A switch type RF connector is a connector having two-direction output. For instance, the first antenna port $102_1$ includes a first switch type RF connector $104_1$, while the second antenna port $102_2$ includes a second switch type RF connector $104_2$. In one example, both the first antenna port $102_1$ and the second antenna port $102_2$ are positioned to the periphery of the radio module 100, e.g., at opposite ends. This arrangement increases the isolation between the first antenna port $102_1$ and the second antenna port $102_2$.

In one example, a third antenna port $102_3$ and a fourth antenna port $102_4$ of the radio module 100 each include a respective receptacle type radio frequency (RF) connector $106_1$ or $106_2$ (hereinafter collectively referred to as "receptacle type RF connectors 106") for connecting to a physical antenna. A receptacle type RF connector is a connector having one-direction output. For instance, the third antenna port $102_3$ includes a first receptacle type RF connector $106_1$, while the fourth antenna port $102_2$ includes a second receptacle type RF connector $106_2$. In one example, both the third antenna port $102_3$ and the fourth antenna port $102_4$ are positioned between the first antenna port $102_1$ and the second antenna port $102_2$.

As illustrated, each port of the plurality of antenna ports 102 is connected to a respective transceiver $108_1$-$108_4$ (hereinafter collectively referred to as "transceivers 108") on a printed circuit board (PCB). For instance, the first antenna port $102_1$ is connected to a first transceiver $108_1$, the second antenna port $102_1$ is connected to a second transceiver $108_2$, the third antenna port $102_3$ is connected to a third transceiver $108_3$, and the fourth antenna port is connected to a fourth transceiver $108_4$. Each of the transceivers 108 may comprise a receiver, a transmitter, or both a receiver and a transmitter. Each of the transceivers 108 may be further connected to a processor 110 on the PCB. If the corresponding antenna port 102 is connected to an antenna, then a given transceiver 108 may process radio signals received at the corresponding antenna, e.g. to extract baseband signals from the radio signals. The given transceiver 108 may additionally or alternatively modulate baseband signals that are to be transmitted by the corresponding antenna. The processor 110 processes the baseband signals that are being sent and received by the radio module 100. The processor 110 may further connect (e.g., via a peripheral component interface express connection or other type of data bus) to the central processing unit (CPU), microcontroller (MCU), or other processing unit of the end product device integrating the radio module 100.

Figure 2A:
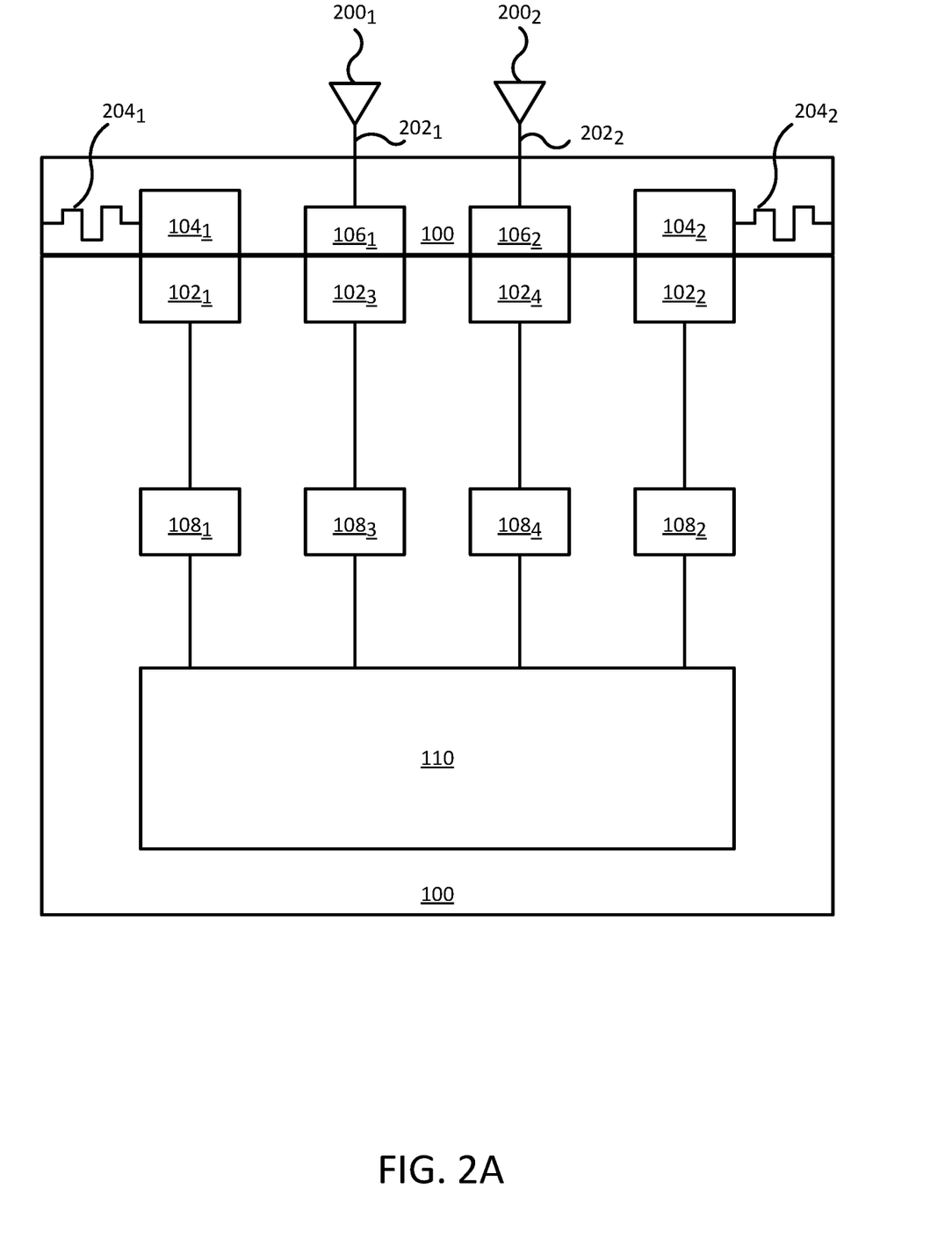
FIG. 2A depicts a high-level block diagram of the example radio module of FIG. 1 in a first mode of operation.

FIG. 2A depicts a high-level block diagram illustrating a more detailed version of the example radio module 100 of FIG. 1, in a first mode of operation. In this first mode of operation, the pend product device (e.g., notebook or laptop computer, tablet computer, mobile phone, etc.) into which the radio module 100 is integrated may have space for no more than two or three antennas, despite having ports for as many as four antennas.

In the example illustrated in FIG. 2A, each of the third antenna port $102_3$ and the fourth antenna port $102_4$ is connected to a respective physical antenna $200_1$ or $200_2$ (e.g., via a respective receptacle type connector $106_1$ or $106_2$ and a cable $202_1$ or $202_2$). Thus, each transceiver $108_3$ and $108_4$ may process radio signals received at the corresponding antennas $200_1$ or $200_2$, e.g. to extract baseband signals from the radio signals. Each transceiver $108_3$ and $108_4$ may additionally or alternatively modulate baseband signals that are to be transmitted by the antennas $200_1$ or $200_2$.

By contrast, neither the first antenna port $102_1$ nor the second antenna port $102_2$ is connected to a physical antenna. Instead, each of the first antenna port $102_1$ and the second antenna port $102_2$ is connected to a respective transceiver $108_1$ or $108_2$ on the PCB (e.g., via a respective trace $204_1$ or $204_2$). In this configuration, each of the first and second antenna ports $102_1$ and $102_2$ routes to the PCB of the radio module 100 via corresponding traces $204_1$ and $204_2$. This allows each of the first and second antenna ports $102_1$ and $102_2$ to function as a monopole antenna that is capable of receiving and transmitting radio signals at the desired frequencies and extracting baseband signals from the radio signals.

The processor 110 processes the baseband signals that are being sent and received by the radio module 100. The processor 110 may further connect (e.g., via a peripheral component interface express connection or other type of data bus) to the central processing unit (CPU), microcontroller (MCU), or other processing unit of the end product device integrating the radio module 100.

The configuration illustrated in FIG. 2A allows the radio module 100 to achieve 4×4 functionality despite having room for no more than two physical antennas (e.g., a first antenna $200_1$ and a second antenna $200_2$ connected, respectively, via the receptacle type connectors $106_1$ and $106_2$ of the third and fourth antenna ports $102_3$ and $102_4$).

Figure 2B:
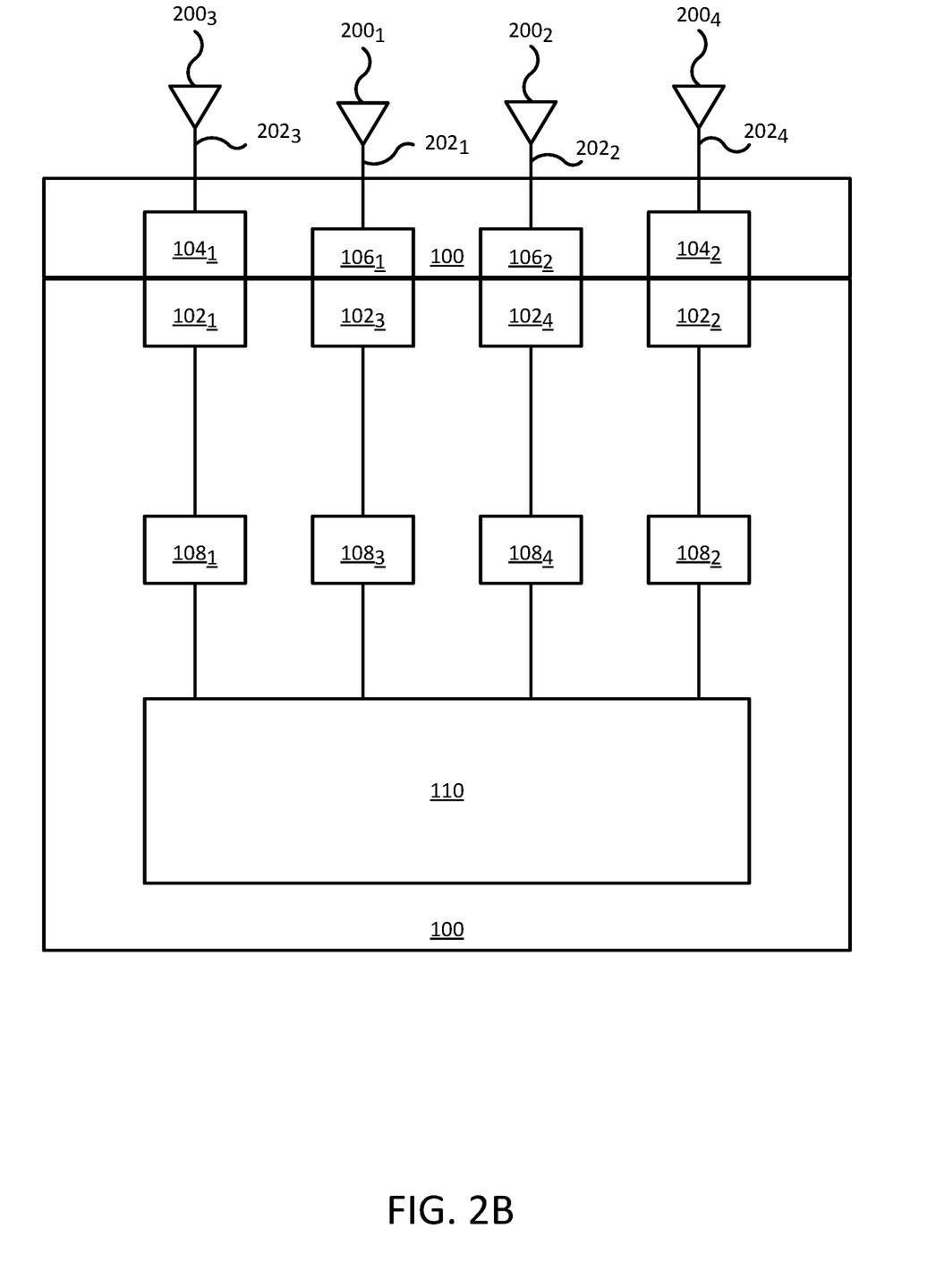
FIG. 2B depicts a high-level block diagram of the example radio module of FIG. 1 in a second mode of operation.

FIG. 2B depicts a high-level block diagram illustrating a more detailed version of the example radio module 100 of FIG. 1, in a second mode of operation. In this second mode of operation, end product device integrating the radio module 100 may have space for at least four antennas.

In the example illustrated in FIG. 2B, each of the third antenna port $102_3$ and the fourth antenna port $102_4$ is connected to a respective physical antenna $200_1$ or $200_2$ (e.g., via a respective receptacle type connector $106_1$ or $106_2$ and a cable $202_1$ or $202_2$). In addition, each of the first antenna port $102_1$ and the second antenna port $102_2$ is also connected to a respective physical antenna $200_3$ or $200_4$ (e.g., via a respective switch type connector $104_1$ or $104_2$ and a cable $202_3$ or $202_4$).

Thus, each transceiver 108 may process radio signals received at the corresponding antenna 200, e.g. to extract baseband signals from the radio signals. Each transceiver 108 may also modulate baseband signals that are to be transmitted by the antennas 200. The processor 110 processes the baseband signals that are being sent and received by the radio module 100. The processor 110 may further connect (e.g., via a peripheral component interface express connection or other type of data bus) to the central processing unit (CPU), microcontroller (MCU), or other processing unit of the end product device integrating the radio module 100.

The configuration illustrated in FIG. 2B allows the radio module 100 to achieve 4×4 functionality using four antennas (e.g., where two of the antennas 200 are connected via switch type connectors 106 to their respective antenna ports 102 and two of the antennas 200 are connected via receptacle type connectors 104 to their respective antenna ports 102).

Figure 3:
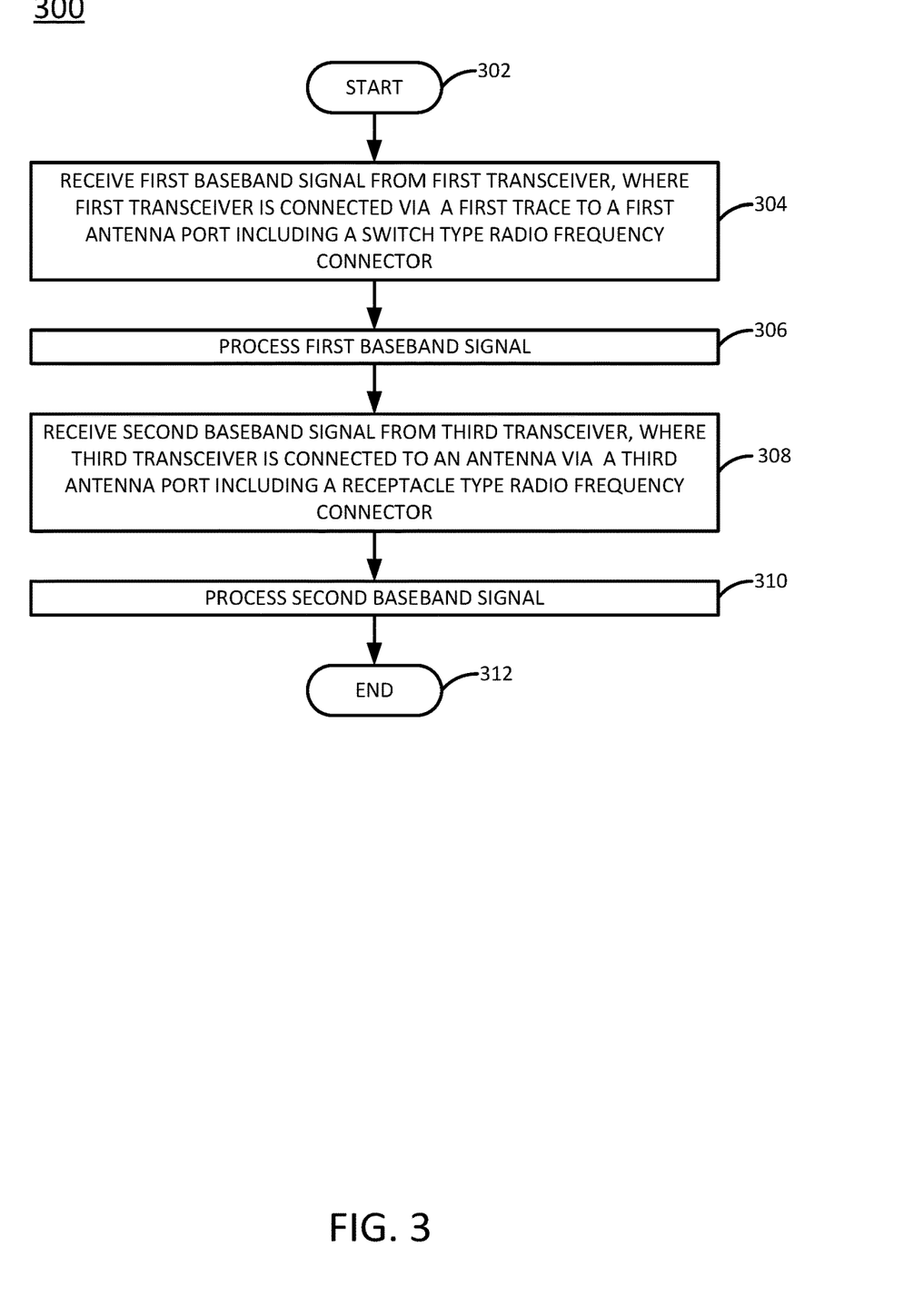
FIG. 3 illustrates a flow diagram of a first example method for processing radio signals by a radio module that uses a combination of receptacle type connectors and switch type connectors to connect antennas to antenna ports of the radio module.
Figure 4:
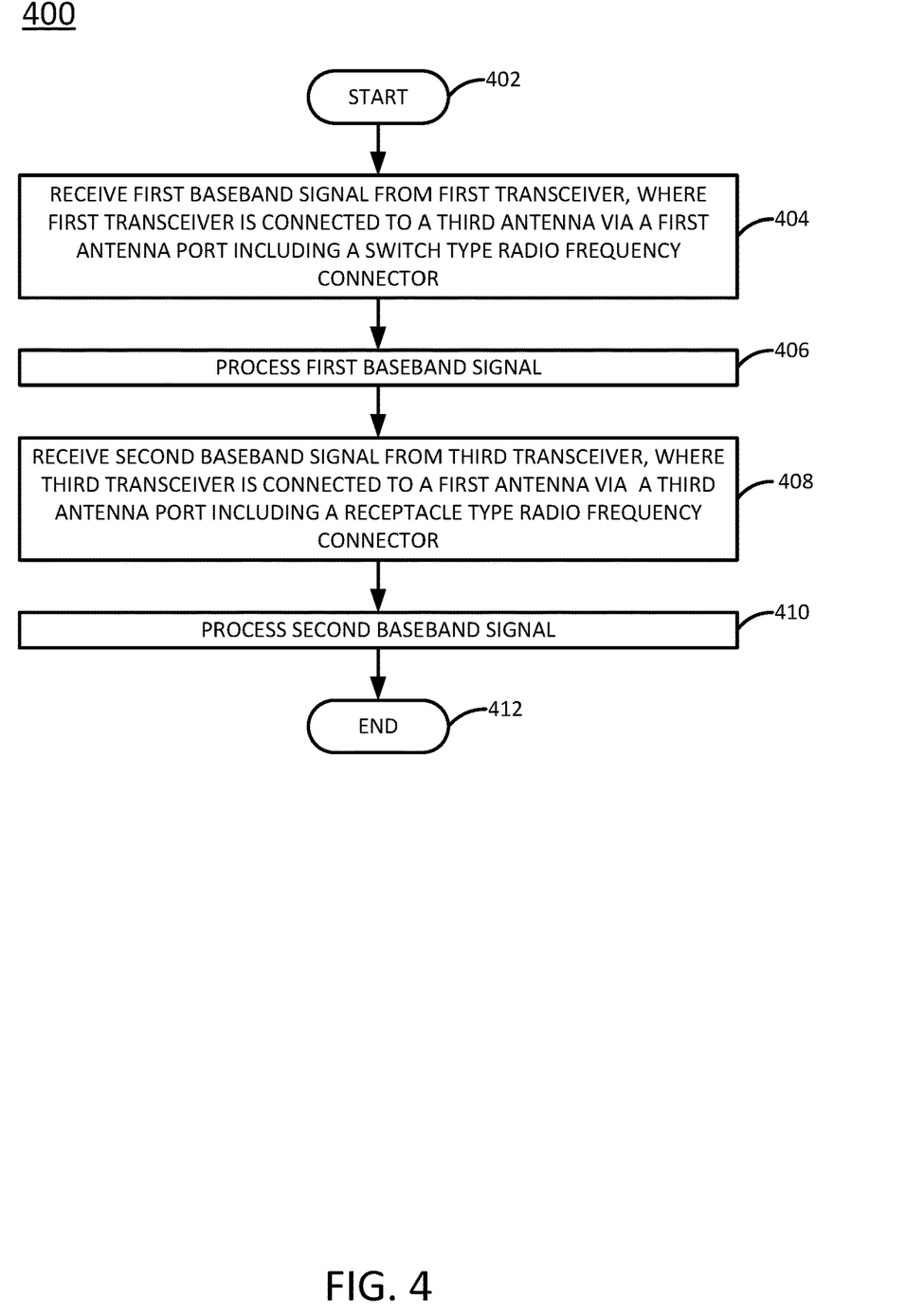
FIG. 4 illustrates a flow diagram of a second example method for processing radio signals by a radio module that uses a combination of receptacle type connectors and switch type connectors to connect antennas to antenna ports of the radio module.

FIGS. 3 and 4 illustrate example methods for processing radio signals by a radio module that uses a combination of receptacle type connectors and switch type connectors to connect antennas to antenna ports of the radio module, as illustrated in FIGS. 1-2B. Throughout the descriptions of FIGS. 3 and 4, terminology such as "first," "second," "third" and fourth" is used to differentiate between similar components of a radio module (e.g., antennas, antenna ports, transceivers, and the like). The use of numerical designations is not intended to imply the presence of any particular number of components, but merely to allow for differentiation between the components and to allow for consistent reference to components of FIGS. 1-2B where such example might be illustrative.

FIG. 3 illustrates a flow diagram of a first example method 300 for processing radio signals by a radio module that uses a combination of receptacle type connectors and switch type connectors to connect antennas to antenna ports of the radio module. The method 300 may be performed, for example, by the processor 110 of the radio module 100 configured as illustrated in FIG. 2A. As such, reference may be made in the discussion of the method 300 to components of the radio module 100 of FIG. 2A. However, such references are made for the sake of example, and are not intended to be limiting.

The method 300 begins in block 302. In block 304, the processor 110 receives a first baseband signal from a first transceiver $108_1$ of the radio module 100. The first transceiver $108_1$ is connected, via a first trace $204_1$, to a first antenna port $102_1$ that includes a first switch type RF connector $104_1$. The first antenna port $102_1$ does not connect to a physical antenna. However, the first antenna port $102_1$ and first trace $204_1$ function as a monopole antenna that is capable of receiving and transmitting radio signals, including a radio signal from which the first transceiver $108_1$ extracts the first baseband signal.

In block 306, the processor 110 processes the first baseband signal.

In block 308, the processor 110 receives a second baseband signal from a third transceiver $108_3$ of the radio module 100. The third transceiver $108_3$ is connected to a third antenna port $102_3$ that includes a first receptacle type RF connector $106_1$. In one example, the second baseband signal received from the third transceiver $108_3$ may include a baseband signal extracted from a radio signal received by a physical antenna $200_1$ connected to the third antenna port $102_3$. In another example, the second baseband signal received from the third transceiver $108_3$ may include a baseband signal to be encoded in a radio signal transmitted by a physical antenna $200_1$ connected to the third antenna port $102_3$.

In block 310, the processor 110 processes the second baseband signal.

The method 300 ends in block 312.

It should be noted that the blocks of the method 300 are not necessarily performed in a sequential order (e.g., one after another). For instance, in a typical MIMO system, different baseband signals may be processed simultaneously. Thus, for instance, blocks 304-306 and 308-310 of the method 300 may be performed at the same time.

FIG. 4 illustrates a flow diagram of a second example method 400 for processing radio signals by a radio module that uses a combination of receptacle type connectors and switch type connectors to connect antennas to antenna ports of the radio module. The method 400 may be performed, for example, by the processor 110 of the radio module 100 configured as illustrated in FIG. 2B. As such, reference may be made in the discussion of the method 400 to components of the radio module 100 of FIG. 2B. However, such references are made for the sake of example, and are not intended to be limiting.

The method 400 begins in block 402. In block 404, the processor 110 receives a first baseband signal from a first transceiver $108_1$ of the radio module 100. The first transceiver $108_1$ is connected to a first antenna port $102_1$ that includes a first switch type RF connector $104_1$. The first antenna port $102_1$ connects to a third antenna $200_3$. In one example, the first baseband signal received from the first transceiver $108_1$ may include a baseband signal extracted from a radio signal received by the third antenna $200_3$. In another example, the first baseband signal received from the first transceiver $108_1$ may include a baseband signal to be encoded in a radio signal transmitted by the third antenna $200_3$ connected to the first antenna port $102_1$.

In block 406, the processor 110 processes the first baseband signal.

In block 408, the processor 110 receives a second baseband signal from a third transceiver $108_3$ of the radio module 100. The third transceiver $108_3$ is connected to a third antenna port $102_3$ that includes a first receptacle type RF connector $106_1$. In one example, the second baseband signal received from the third transceiver $108_3$ may include a baseband signal extracted from a radio signal received by a first antenna $200_1$ connected to the third antenna port $102_3$. In another example, the second baseband signal received from the third transceiver $108_3$ may include a baseband signal to be encoded in a radio signal transmitted by the first antenna $200_1$ connected to the third antenna port $102_3$.

In block 410, the processor 110 processes the second baseband signal.

The method 400 ends in block 412.

It should be noted that the blocks of the method 400 are not necessarily performed in a sequential order (e.g., one after another). For instance, in a typical MIMO system, different baseband signals may be processed simultaneously. Thus, for instance, blocks 404-406 and 408-410 of the method 400 may be performed at the same time.

It should also be noted that although not explicitly specified, some of the blocks, functions, or operations of the methods 300 or 400 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIG. 3 or 4 that recite a determining operation, or involve a decision, do not imply that both branches of the determining operation are practiced. In other words, one of the branches of the determining operation may not be performed, depending on the results of the determining operation.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A radio module, comprising:
   a first antenna port connected to a first transceiver and including a first switch type radio frequency connector;
   a second antenna port connected to a second transceiver and including a second switch type radio frequency connector;
   a third antenna port connected to a third transceiver and including a first receptacle type radio frequency connector connected to a first physical antenna;
   a fourth antenna port connected to a fourth transceiver and including a second receptacle type radio frequency connector connected to a second physical antenna; and
   a processor connected to the first transceiver, the second transceiver, the third transceiver, and the fourth transceiver, wherein the processor, the first transceiver, the second transceiver, the third transceiver, and the fourth transceiver are on a same printed circuit board of the radio module,
   wherein the radio module achieves four transmitting antennas and four receiving antennas without any physical antennas in addition to the first physical antenna and the second physical antenna.

2. The radio module of claim 1, wherein the first antenna port is connected to the printed circuit board of the radio module via a first trace.

3. The radio module of claim 2, wherein the first antenna port functions as a first monopole antenna for a radio signal.

4. The radio module of claim 1, wherein third antenna port and the fourth antenna port are positioned between the first antenna port and the second antenna port.

5. A method, comprising:
   receiving, by processor of a radio module, a first baseband signal from a first transceiver of the radio module, wherein the first transceiver is connected via a first trace to a first antenna port including a first switch type radio frequency connector;

processing, by the processor, the first baseband signal;

receiving, by the processor, a second baseband signal from a second transceiver of the radio module, wherein the second transceiver is connected to a first physical antenna via a second antenna port including a first receptacle type radio frequency connector; and processing, by the processor, the second baseband signal, wherein the processor, the first transceiver, and the second transceiver are on a same printed circuit board of the radio module with a third transceiver of the radio module which is connected via a second trace to a third antenna port including a second switch type radio frequency connector and with a fourth transceiver of the radio module which is connected to a second physical antenna via a fourth antenna port including a second receptacle type radio frequency connector, wherein the radio module achieves four transmitting antennas and four receiving antennas without any physical antennas in addition to the first physical antenna and the second physical antenna.

6. The method of claim 5, wherein the radio module is a multiple input, multiple output radio module.

7. A method, comprising:

receiving, by a processor of a radio module, a first baseband signal from a first transceiver of the radio module, wherein the first transceiver is connected to a first miniature antenna via a first antenna port including a first switch type radio frequency connector;

processing, by the processor, the first baseband signal;

receiving, by the processor, a second baseband signal from a second transceiver of the radio module, wherein the second transceiver is connected to a first physical antenna via a second antenna port including a first receptacle type radio frequency connector; and processing, by the processor, the second baseband signal, wherein the processor, the first transceiver, and the second transceiver are on a same printed circuit board of the radio module with a third transceiver of the radio module which is connected to a second miniature antenna via a third antenna port including a second switch type radio frequency connector and with a fourth transceiver of the radio module which is connected to a second physical antenna via a fourth antenna port including a second receptacle type radio frequency connector, wherein the radio module achieves four transmitting antennas and four receiving antennas without any physical antennas in addition to the first physical antenna and the second physical antenna.

8. The method of claim 7, wherein the radio module is a multiple input, multiple output radio module.

9. The radio module of claim 4, wherein the first antenna port and the second antenna port are positioned on a periphery of the radio module, at opposite ends of the radio module.

10. The radio module of claim 2, wherein the second antenna port is connected to the printed circuit board of the radio module via a second trace.

11. The radio module of claim 10, wherein the second antenna port functions as a second monopole antenna for a radio signal.

12. The radio module of claim 2, wherein the second antenna port connects to a miniature antenna integrated in a printed circuit board that is separate from the printed circuit board of the radio module.

13. The radio module of claim 1, wherein the first antenna port is connected to a miniature antenna integrated in a printed circuit board that is separate from the printed circuit board of the radio module.

14. The method of claim 5, wherein second antenna port and the fourth antenna port are positioned between the first antenna port and the third antenna port.

15. The method of claim 14, wherein the first antenna port and the third antenna port are positioned on a periphery of the radio module, at opposite ends of the radio module.

16. The method of claim 7, wherein second antenna port and the fourth antenna port are positioned between the first antenna port and the third antenna port.

17. The method of claim 16, wherein the first antenna port and the third antenna port are positioned on a periphery of the radio module, at opposite ends of the radio module.

* * * * *